(12) United States Patent
Jamieson

(10) Patent No.: US 6,227,310 B1
(45) Date of Patent: May 8, 2001

(54) METHOD AND APPARATUS FOR PROVIDING A MAGNETIC DIRECTION REFERENCE

(75) Inventor: Angus Lamberton Jamieson, Banchory (GB)

(73) Assignee: Tech-21 Limited, Banchory (GB)

( * ) Notice: Subject to any disclaimer, the term of this patent is extended or adjusted under 35 U.S.C. 154(b) by 0 days.

(21) Appl. No.: 09/242,575
(22) PCT Filed: Aug. 19, 1997
(86) PCT No.: PCT/GB97/02216
 § 371 Date: Jun. 10, 1999
 § 102(e) Date: Jun. 10, 1999
(87) PCT Pub. No.: WO98/07958
 PCT Pub. Date: Feb. 26, 1998

(30) Foreign Application Priority Data

Aug. 19, 1996 (DE) .................................. 96 17 372
Dec. 28, 1996 (DE) .................................. 96 27 008
Apr. 5, 1997 (DE) .................................. 97 06 993

(51) Int. Cl.⁷ ........................................ G01V 3/08
(52) U.S. Cl. ................ 175/40; 175/57; 166/66; 166/113; 166/250.01; 33/303; 33/310; 33/313; 33/355 R; 33/DIG. 1; 181/104; 702/6
(58) Field of Search ...................... 175/40, 45, 57, 175/61; 166/66, 113, 250.01; 33/301–303, 310, 313, 355 R, DIG. 1; 181/101, 104; 702/6

(56) References Cited

U.S. PATENT DOCUMENTS

| 4,472,884 | * | 9/1984 | Engebretson | 33/304 |
| 4,721,055 | * | 1/1988 | Pado | 114/331 |
| 4,909,336 | * | 3/1990 | Brown et al. | 175/45 |
| 5,075,693 | * | 12/1991 | McMillan et al. | 342/457 |
| 5,163,521 |   | 11/1992 | Pustanyk et al. | 175/40 |
| 5,339,246 |   | 8/1994 | Kao | 364/457 |
| 5,349,531 |   | 9/1994 | Sato et al. | 364/449 |
| 5,534,875 |   | 7/1996 | Diefes et al. | 342/357 |
| 5,689,445 | * | 11/1997 | Vogt et al. | 364/559 |

OTHER PUBLICATIONS

Patent Abstracts of Japan, vol. 008, No. 089, Re. JP 59 003374 A, Shimazu Seisakusho KK, Jan. 10, 1984.

Patent Abstracts of Japan, vol. 096, No. 009, Re. JP 08 136260 A, Casio Comput Co Ltd, May 31, 1996.

* cited by examiner

Primary Examiner—Roger Schoeppel
(74) Attorney, Agent, or Firm—Ratner & Prestia

(57) ABSTRACT

A magnetic observatory device is deployed at a fixed location such as the sea bed to provide data measuring variations in the local earth magnetic field. This data is used to correct information from magnetic direction sensors, for example in a measurement-while-drilling system of a drill string. Also described is a reference apparatus for initial calibration of the device or for marine magnetic mapping purposes.

10 Claims, 3 Drawing Sheets

METHOD AND APPARATUS FOR PROVIDING A MAGNETIC DIRECTION REFERENCE

This application is the U.S. national phase application of PCT International Application No. PCT/GB97/02216 filed Aug. 19, 1997.

This invention relates to methods and apparatus for use in establishing directional information by reference to the earth's magnetic field.

The earth's magnetic field allows relatively simple and inexpensive methods to be used to establish direction with reference to north. As is well known, however, at any given point on the earth's surface there is a discrepancy ("variation") between magnetic north and true north, and the variation changes slowly over time. In addition, the variation at any given point is subject to considerable short term alterations including a noticeable diurnal pattern, and can be significantly affected by proximity to masses of magnetic material, whether natural or manmade. These factors limit the usefulness of magnetic techniques in providing accurate positional or directional information.

The present invention is particularly, but not exclusively, concerned with the control of directional drilling of oil wells and the like. In the offshore oil industry, requirements for enhanced recovery and recovery from deep fields have led to an increasing requirement for long range directional drilling of high accuracy, but these techniques are limited by a lack of information as to the position and direction of the working end of the drill string.

It is increasingly common to make use of measurement while drilling ("MWD") techniques in which instruments located immediately adjacent the drill bit transmit measured information to the surface by means such as mud pulse telemetry. It is possible to make use of magnetic sensors in MWD in an attempt to monitor the orientation of the drill bit with respect to true north, but the accuracy obtainable by magnetic measurement is not sufficient to provide the required degree of positional and directional accuracy.

It is also known that a bore hole can be surveyed to a high degree of accuracy by means of mechanical or solid state gyros. These however cannot be used while drilling, and therefore a survey of this nature requires the drilling operation to be stopped while the bore hole is surveyed with a gyro instrument package inserted on a wireline through the drill string.

One object of the present invention is to provide a method and apparatus which enables the accuracy of magnetic directional sensors to be substantially increased.

The present invention, from one aspect, provides a method of providing a magnetic reference for use in determining direction, the method comprising:
providing a magnetic observatory device which includes magnetometer means for detecting the direction of the earth's magnetic field and telemetry means for transmitting information derived from the magnetometer means to a remote location;
positioning said magnetic observatory device at a fixed location relative to the surface of the earth;
establishing the orientation of the magnetic observatory device with respect to true North;
deriving from said information the instantaneous variation between true North and magnetic North in the vicinity of said location.

From another aspect, the present invention provides a magnetic reference apparatus comprising magnetometer means responsive to the earth's magnetic field to provide output signals representative of the orientation of the apparatus with respect to the earth's magnetic field, and heading reference means providing a directional reference related to true North.

A further aspect of the invention resides in a magnetic reference apparatus comprising magnetometer means responsive to the earth's magnetic field to provide output signals representative of the orientation of the apparatus with respect to the earth's magnetic field, and heading reference means providing a directional reference related to true North.

In a particularly preferred form of the invention, the magnetic observatory device is deployed at a desired location, typically on the sea bed, and provides data for correcting the output of a magnetic MWD system, and the orientation of the magnetic observatory device with respect to true north is determined at the time of deployment by use of the magnetic reference apparatus.

Embodiments of the present invention will now be described, by way of example, with reference to the accompanying drawings, in which.

Figure 1:
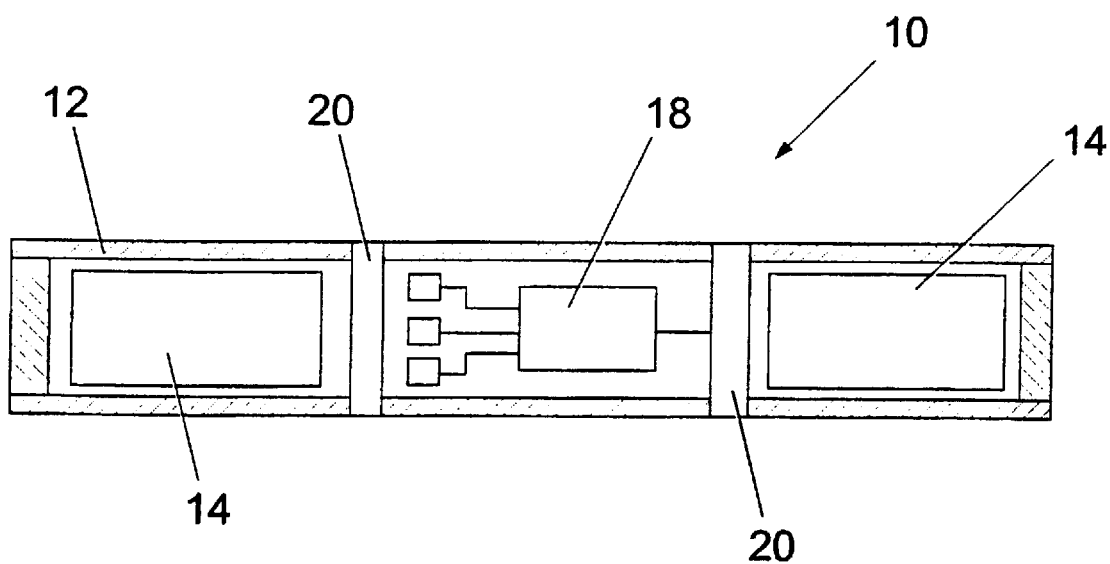
FIG. 1 is a schematic cross-sectional view of a magnetic observatory device forming one embodiment of the present invention.

Referring to FIG. 1, a magnetic observatory device has a housing 12 which may for example be formed by a length of stainless steel drill collar with suitable end caps. The device is powered by battery packs 14 and contains 3-axis magnetometers 16 arranged to measure local magnetism on x, y and z axes. Suitable forms of magnetometer are well known in the art. The output signals from the magnetometers 16 are transmitted via an electronics module 18 and acoustic transducers 20 to a remote location.

Figure 2:
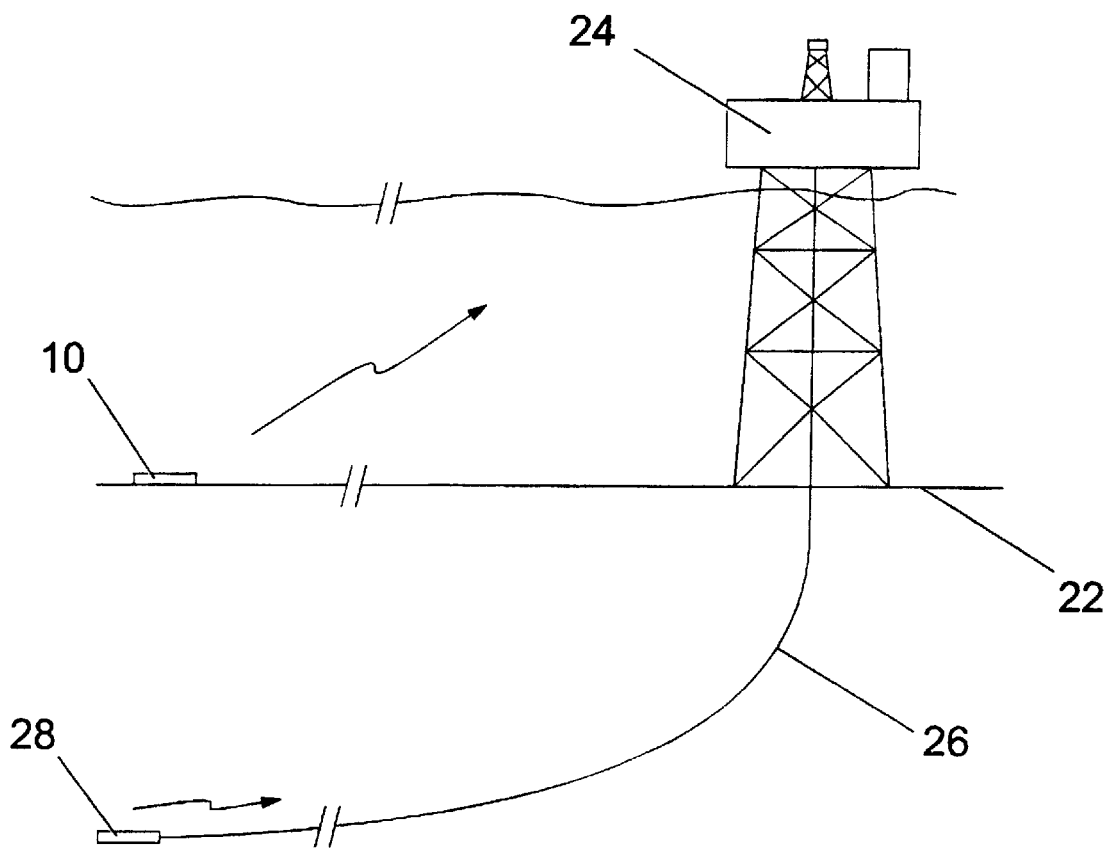
FIG. 2 illustrates the device of FIG. 1 in use in connection with marine drilling.

Referring to FIG. 2, in one application of the invention the device 10 is placed on the seabed 22 in the vicinity of a drilling rig 24. The device 10 therefore supplies to the drilling rig 24 data defining the instantaneous characteristics of the earth's magnetic field in the locality. The data is suitably in the form of the declination and dip of the local magnetic field, which can readily be derived from the triaxial magnetometer signals by processing either in the device 10 or on the rig 24. It may also be useful to derive the magnetic field strength.

A drill string 26 extends from the rig 24 for directional drilling and is terminated in a bottom hole assembly 28 which includes a drill bit and an MWD apparatus. The MWD apparatus includes a magnetic sensor of known type which makes use of the earth's magnetic field to derive a directional signal, the signal being transmitted to the surface by mud pulse telemetry.

It is therefore possible to use the data from the observatory device 10 to correct the directional signals from the bottom hole assembly 28 to provide accurate, substantially real-time, directional information and thus to define accurately the position of the bottom hole assembly 28 in three dimensions as drilling progresses.

It will be appreciated that the observatory device 10 should be deployed on the seabed 22 in a position remote from localised magnetic anomalies, and in this connection it has been found that the large quantity of steelwork in a typical drilling platform or rig produces a surprisingly large local anomaly.

The observatory device 10 will normally be deployed on the seabed by lowering it on a cable, or simply by dropping it, with the result that the orientation of the device 10 will be unknown. The apparatus used in FIG. 3 may be used in an initial calibration step to establish accurately the orientation of the device 10 with regard to true north.

Figure 3:
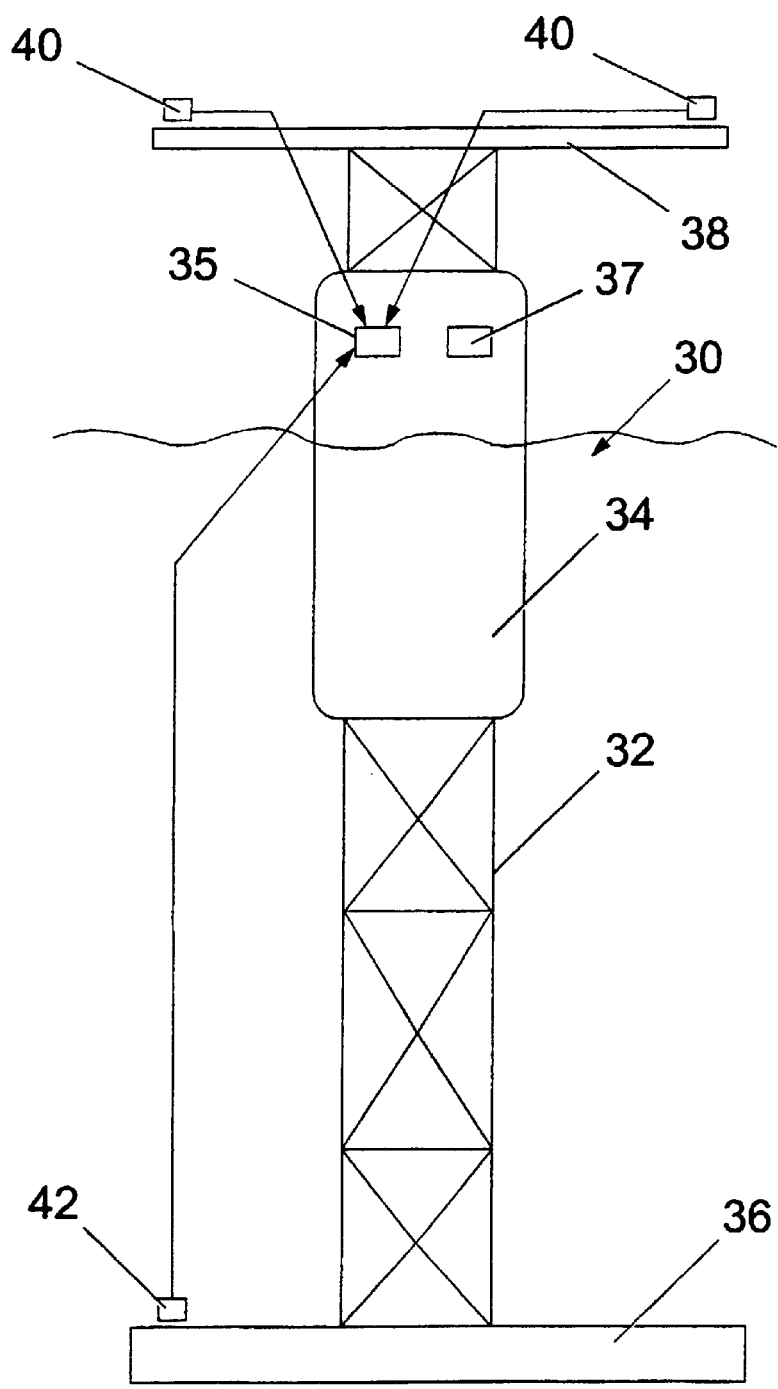
FIG. 3 illustrates a magnetic reference apparatus forming a further embodiment of the present invention and which may be used in conjunction with a device of FIG. 1 or independently.

FIG. 3 shows an apparatus in the form of a tower body 30 comprising a latticework tower 32 with a flotation spar 34 and a ballast keel 36. The top of the tower 32 mounts an accurate, stiff aluminium bar 38 at either end of which is mounted a GPS receiver 40. The GPS signals received by the receivers 40 are compared and the phase difference between the signals is measured to derive measurements of change of heading, pitch and roll, in a signal processing module 35. The module 35 may also receive heading information from an accurate gyro source 37. These parameters can typically be measured to accuracies of about 0.025 degrees and are not subject to drift.

A 3-axis magnetometer arrangement indicated generally at 42 is positioned at the keel 36 of the apparatus for measuring the x, y and z components of the earth's magnetic field.

The apparatus 30 is used as follows.

The apparatus 30 is first calibrated on-shore at a magnetically clean site where multiple readings are taken of heading, pitch, roll and magnetic readings on each axis. The data collected for each axis will consist of the correct dot product of the earth's magnetic field vector with the attitude vector of the magnetic axis. If the earth's magnetic field is accurately known at that site, the misalignment of the magnetometer axis can be established with respect to the pitch, roll and heading axes.

The apparatus 30 is then checked for magnetic interference by rotating the apparatus to see if any magnetic component is constant on any axis as the apparatus is turned.

Any other earth magnetic vector can now be monitored with confidence as long as the apparatus 30 is not damaged and is held stationary. At sea this is not possible so a software program is used whereby the attitude sensors and the magnetic sensors are read by connecting them to a computer. The data all arrives at different times but an accurate satellite clock is used to time stamp all the data which is fed into a Kalman Filter to produce running curves to model the motion of the buoy with time. When a magnetic reading arrives, its exact age is known in milliseconds and can be entered into the Kalman Filter to "deskew" the times of the data, by interpolating the motion curves and bringing it to a single point in time.

In a prototype, an accurate GPS Gyro was used along with an inertial motion reference unit which provided data up to 50 times per second, allowing accurate curves around the time of generation of the magnetic data. Having established the earth's magnetic filed accurately at the surface, this allows us to use the seabed system 10 which can subsequently monitor for changes to that field with time at that location. In practice, since the earth's magnetic field varies during the course of the day (the diurnal variations), it is useful to obtain data from the seabed system while using the surface system so that these diurnal variations from the day's average can be corrected for in the surface system data.

It would also be possible in principle to use a 3-axis set of magnetometers with only a gyro reference, but the accuracy of such an arrangement suffers from time drift of the gyro and possible magnetic interference between the gyro equipment and the magnetometers.

In the situation in FIG. 2, the reference apparatus of FIG. 3 can be deployed temporarily in the vicinity of the observatory device 10. The reference apparatus is used to derive instantaneous magnetic data and relate this to the direction of true north, and thus by matching the magnetic data from both devices the orientation of the observatory device 10 with respect to true north can be determined. The relatively complex reference apparatus can then be removed for other uses.

The reference apparatus of FIG. 3 may be used in other ways. In particular, it may be towed behind a suitable vessel for the purpose of conducting magnetic surveys in general, and in one particular use of this nature it may be used to establish very accurately the location of anomalies in the magnetic field caused, for example, by shipwrecks. The vector analysis determines the vector of addition to the earth's magnetic field, and by sailing over a wide area and monitoring the additional vector the centre of the magnetic influence can be pinpointed very quickly.

For a general survey, the towing vessel may be equipped with a reference gyro and with a fan beam laser which cooperates with reflector prisms at a fixed location, such as an oil rig. A base line is established from the rig by theodolite survey, and the fan beam and gyro are used to steer the towing vessel on a predetermined route, suitably at about 5 degrees to the baseline.

By providing the apparatus in the form of a buoy which may be towed behind a vessel, the effect of the magnetic structure of the towing vessel may be minimized.

Where magnetic MWD is being used in directional drilling in a deep water field, it may not be convenient to deploy an observatory apparatus on the seabed. In this event, the apparatus of FIG. 3 may be moored in the vicinity to provide the reference information.

Although described with particular reference to marine use, the present invention may also be used in terrestrial applications.

Modifications may be made to the foregoing embodiments within the scope of the invention, as defined in the claims. For example, in the case of a seabed observatory device the acoustic telemetry system could be replaced by wireline transmission to a surface buoy and thence by radio.

What is claimed is:

1. A method of providing a magnetic reference for use in determining direction, the method comprising:

providing a magnetic observatory device which includes magnetometer means for detecting the direction of the earth's magnetic field and telemetry means for transmitting information derived from the magnetometer means to a remote location;

positioning said magnetic observatory device at a fixed first location relative to the surface of the earth;

establishing the orientation of the magnetic observatory device with respect to true North;

deriving from said information the instantaneous variation between true North and magnetic North in the vicinity of said location; and using said variation in real time at a second location spaced from the magnetic observatory device as a reference in conjunction with locally derived magnetic North information.

2. The method of claim 1, in which the declination and dip of the earth's magnetic field are derived from the outputs of the magnetometer means.

3. The method of claim 2, in which the magnetic field intensity is also measured.

4. The method of any of the preceding claims, in which the orientation of the magnetic observatory device with respect to true North is determined following positioning of said device by comparing its output with that of a reference apparatus deployed temporarily in the same vicinity.

5. The method of claim 4, in which the magnetic observatory device is positioned on the seabed and the reference apparatus is at the sea surface.

6. A method of controlling directional drilling of a borehole, in which the borehole is drilled with a drill string having a bottom hole assembly including magnetic sensor means for detecting the earth's magnetic field and telemetry means for transmitting information from the magnetic sensor means to the surface, and in which a magnetic reference is provided by the method of any of claims 1 to 3, and said information and the magnetic reference are compared to derive accurate information relating to the position and/or direction of the bottom hole assembly.

7. A magnetic observatory device for use in the method of claim 5, comprising magnetometer means responsive to the earth's magnetic field to provide output signals representative of the orientation of the device with respect to the earth's magnetic field, and telemetry means for transmitting said signals to a remote location; the magnetometer means and the telemetry means being contained within a watertight, non-magnetic housing; and in which the telemetry means comprises acoustic transducer means.

8. A magnetic reference apparatus for use in measuring and establishing the unknown earth's magnetic field, the apparatus comprising floatation means supporting the apparatus at the sea surface, magnetometer means responsive to the earth's magnetic field to provide output signals representative of the orientation of the apparatus with respect to the earth's magnetic field, heading reference means providing a directional reference related to true North, and means for measuring attitude changes of the apparatus during use.

9. Apparatus according to claim 8, in which the heading reference means and the attitude change measurement means are provided by a pair of GPS receivers mounted at spaced locations on the apparatus, and means for measuring phase difference in signals received by said receivers to derive therefrom changes in heading and attitude.

10. Apparatus according to claim 9, in which said signals relate to heading, pitch and roll.

\* \* \* \* \*

UNITED STATES PATENT AND TRADEMARK OFFICE
CERTIFICATE OF CORRECTION

PATENT NO. : 6,227,310 B1            Page 1 of 1
DATED : May 8, 2001
INVENTOR(S) : Jamieson It is certified that error appears in the above-identified patent and that said Letters Patent is hereby corrected as shown below:

<u>Title page,</u>
Item [30], Foreign Application Priority Data,

Aug. 19, 1996 (GB) ................................................. 96 17 372
Dec. 28, 1996 (GB) ................................................. 96 27 008
Apr.  5, 1997 (GB) ................................................. 97 06 993

Signed and Sealed this

Eighth Day of January, 2002

Attest:

JAMES E. ROGAN
*Attesting Officer*     *Director of the United States Patent and Trademark Office*